United States Patent [19]
Watanabe

[11] Patent Number: 5,956,099
[45] Date of Patent: Sep. 21, 1999

[54] DYNAMIC FOCUS CIRCUIT AND DISPLAY USING THE SAME

[75] Inventor: Toshimitsu Watanabe, Yokohama, Japan

[73] Assignee: Hitachi, Ltd., Tokyo, Japan

[21] Appl. No.: 08/756,785

[22] Filed: Nov. 26, 1996

[30] Foreign Application Priority Data

Dec. 7, 1995 [JP] Japan .................................. 7-319290

[51] Int. Cl.⁶ ...................................................... H04N 5/68
[52] U.S. Cl. ........................ 348/805; 330/310; 348/326; 315/382
[58] Field of Search ................................. 315/382, 382.1; 348/325, 326, 327, 805, 806, 379, 380; 330/270, 310, 83, 124 R, 272; H04N 5/68

[56] References Cited

U.S. PATENT DOCUMENTS

| | | | |
|---|---|---|---|
| 4,302,727 | 11/1981 | Iwamatsu | 330/272 |
| 5,017,844 | 5/1991 | Lendaro | 348/805 |
| 5,146,142 | 9/1992 | Van Tol | 315/382 |
| 5,532,558 | 7/1996 | George | 315/382.1 |
| 5,663,617 | 9/1997 | Kobayshi | 315/382 |

FOREIGN PATENT DOCUMENTS

| | | | |
|---|---|---|---|
| 3-3961 | 1/1991 | Japan . | |
| 3-165665 | 7/1991 | Japan . | |
| 91-165665 | 7/1991 | Japan | H04N 3/26 |

*Primary Examiner*—Tuan Ho
*Attorney, Agent, or Firm*—Frohwitter; R. William Beard, Jr.

[57] ABSTRACT

A circuit for clipping a dynamic focus voltage waveform during a horizontal retrace time is provided so as to prevent an unnecessary voltage from occurring during the retrace time. A high gain amplifier for amplifying horizontal and vertical parabolic waves is provided with an output circuit used as an emitter follower, a D.C. feedback circuit and a boot strap circuit composed of a capacitor. As a result, a display can be provided which is capable of performing a large amplitude operation without increasing power losses, realizing a satisfactory frequency response simultaneously with the amplitude operation and providing excellent focus properties over the entire screen thereof.

7 Claims, 6 Drawing Sheets

DYNAMIC FOCUS CIRCUIT AND DISPLAY USING THE SAME

BACKGROUND OF THE INVENTION

1. Field of the Invention:

The present invention relates to a dynamic focus circuit suitable for use in a cathode-ray tube for deflecting a large screen size and a wide angle or a thick-neck type cathode-ray tube having a large-diameter electron lens, and to a display using the dynamic focus circuit, which includes a television receiver, etc.

2. Description of the Related Art:

In a cathode-ray tube employed in a television receiver or the like, the distance of an electron beam to the center portion of the screen thereof generally differs from that thereof to its corner portion. Therefore, even if the electron beam is adjusted to the most satisfactory focus at the central portion of the screen thereof, the electron beam overconverges on the corner portion if left as it is. This phenomenon significantly occurs in, particularly, a display including a television receiver or the like using a cathode-ray tube for deflecting a large screen size and a wide angle or a thick-neck type cathode-ray tube having a large-diameter electron lens.

Therefore, in this type of display, a dynamic focus voltage varied according to the position of deflection of the electron beam is normally produced by a dynamic focus circuit. The produced dynamic focus voltage is applied to a focus electrode of the cathode-ray tube. This has provided compensation for focusing so as to maintain the electron beam at the most suitable focus over the entire screen.

However, there has been a demand for increasing the dynamic focus voltage to a further high voltage with a great increase in the screen of a television receiver or a display or the like, which has been used in recent years, the widening of a deflecting angle employed therein and a great increase in diameter of an electron gun employed therein. The value of such a voltage has been rendered very high.

To meet such a demand, a method of generating a high voltage using a transformer and a method of generating a high voltage using a high-voltage power supply and active elements such as a transistor, etc. have heretofore been used by way of example. As a prior art related to the former method, may be mentioned Japanese Patent Application Laid-Open No. 3(1991)-165665, for example. Further, Japanese Patent Application Laid-Open No. 3(1991)-3961 is known as a prior art related to the latter method.

However, the methods according to the prior arts described above have the following problems.

According to the former method, i.e., the method of boosting the voltage using the transformer to obtain the dynamic focus voltage, a necessary high dynamic focus voltage can be obtained by increasing a turn ratio of the transformer. However, the core of the transformer increases in size correspondingly. Therefore, the present method has a drawback that it is necessary to increase the area of a circuit board and the cost of materials for the transformer becomes high.

Further, the latter prior art also has a drawback that since a power supply whose supply voltage is further higher than that employed in the prior art, is required to obtain a dynamic focus voltage whose amplitude is made greater, the cost of the power supply rises in the same manner as described above. The present prior art is also accompanied by a drawback that since a absolute maximum voltage characteristic of a transistor element capable of withstanding a high voltage is required with the increase in the voltage of the power supply, the cost of the circuit rises in the same manner as described above. It is also necessary to make a circuit contrivance or the like for ensuring a through rate of the circuit according to the increase in the voltage of the power supply. In addition to this, a problem arises that the operation (particularly, such as the amplitude of an output thereof, the D.C. potential of the output thereof) of an amplifier circuit becomes unstable due to external factors such as a change in temperature, etc.

SUMMARY OF THE INVENTION

With the foregoing problems in view, it is an object of the present invention to provide a dynamic focus circuit capable of obtaining a dynamic focus voltage whose amplitude is greater, without a significant rise in the cost and to provide a display using the dynamic focus circuit.

It is another object of the present invention to provide a circuit for ensuring a sufficient through rate to obtain a high dynamic focus voltage without a great rise in the cost.

It is a further object of the present invention to provide a dynamic focus circuit capable of obtaining a high dynamic focus voltage and providing a stable operation even if changes in external factors such as temperature, etc. exist.

According to the present invention, for achieving the above objects, there is provided a dynamic focus circuit for producing a dynamic focus voltage for controlling a focusing field of a beam of electrons according to the position of deflection of the beam applied onto a display screen of a cathode-ray tube, from a focus electrode of a display using the cathode-ray tube, comprising:

a horizontal cycle signal generator for generating a focus control voltage signal of a horizontal cycle changed into a parabolic shape according to the position of deflection of the electron beam;

a clip circuit for clipping a retrace voltage of the focus control voltage signal produced from the horizontal cycle signal generator;

a vertical cycle signal generator for generating a focus control voltage signal of a vertical cycle changed into a parabolic shape according to the position of deflection of the electron beam;

an adder circuit for adding the focus control voltage signal whose retrace voltage has been clipped by the clip circuit, to the focus control voltage signal produced from the vertical cycle signal generator; and an amplifier for amplifying a voltage signal corresponding to the result of addition by the adder circuit.

Further, according to the present invention, for achieving the above objects, the dynamic focus circuit is provided wherein the amplifier further includes a boot strap circuit.

Still further, according to the present invention, for achieving the above objects, the dynamic focus circuit is provided wherein the boot strap circuit has a cascode amplifier which is composed of a grounded-base first transistor and a grounded-emitter second transistor and in which a third transistor of an emitter follower is connected to a collector terminal of the first transistor, a first resistor and a second resistor are series-connected to an emitter terminal of the third transistor so as to provide a fraction of a voltage applied thereacross, an emitter terminal of a fourth transistor is connected to a junction between the first and second resistors, and a collector terminal of the fourth transistor is connected to a base terminal of the second transistor and a base terminal thereof is used as an input terminal.

Still further, according to the present invention, for achieving the above objects, the dynamic focus circuit is provided wherein the amplifier further has a D.C. feedback circuit for compensating for temperature drifts.

According to the present invention, for achieving the above objects, there is also provided a dynamic focus circuit for producing a dynamic focus voltage for controlling a focusing field of a beam of electrons according to the position of deflection of the beam applied onto a display screen of a cathode-ray tube, from a focus electrode of a display using the cathode-ray tube, comprising:

a horizontal cycle signal generator for generating a focus control voltage signal of a horizontal cycle changed into a parabolic shape according to the position of deflection of the electron beam;

a vertical cycle signal generator for generating a focus control voltage signal of a vertical cycle changed into a parabolic shape according to the position of deflection of the electron beam;

an adder circuit for adding the focus control voltage signal to the focus control voltage signal generated from the vertical cycle signal generator;

an amplifier for amplifying a voltage signal corresponding to the result of addition by the adder circuit; and a power circuit for supplying a source voltage to the amplifier, the power circuit having means for increasing the supplied voltage according to a retrace time of the focus control voltage signal generated from the horizontal cycle signal generator.

Further, according to the present invention, for achieving the above objects, the dynamic focus circuit is provided wherein the amplifier further includes a boot strap circuit.

Still further, according to the present invention, for achieving the above objects, the dynamic focus circuit is provided wherein the boot strap circuit has a cascode amplifier which is composed of a grounded-base first transistor and a grounded-emitter second transistor and in which a third transistor of an emitter follower is connected to a collector terminal of the first transistor, a first resistor and a second resistor are series-connected to an emitter terminal of the third transistor so as to provide a fraction of a voltage applied thereacross, an emitter terminal of a fourth transistor is connected to a junction between the first and second resistors, and a collector terminal of the fourth transistor is connected to a base terminal of the second transistor and a base terminal thereof is used as an input terminal.

Still further, according to the present invention, for achieving the above objects, the dynamic focus circuit is provided wherein the amplifier further has a D.C. feedback circuit for compensating for temperature drifts.

According to the present invention, for achieving the above object, there is further provided a display comprising:

the dynamic focus circuit described above; and a cathode-ray tube having a focus electrode, the focus electrode thereof being supplied with a voltage signal outputted from the dynamic focus circuit.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The present invention will now be described with reference to the accompanying drawings wherein.

DETAILED DESCRIPTION OF THE PREFERRED EMBODIMENTS

Figure 1:
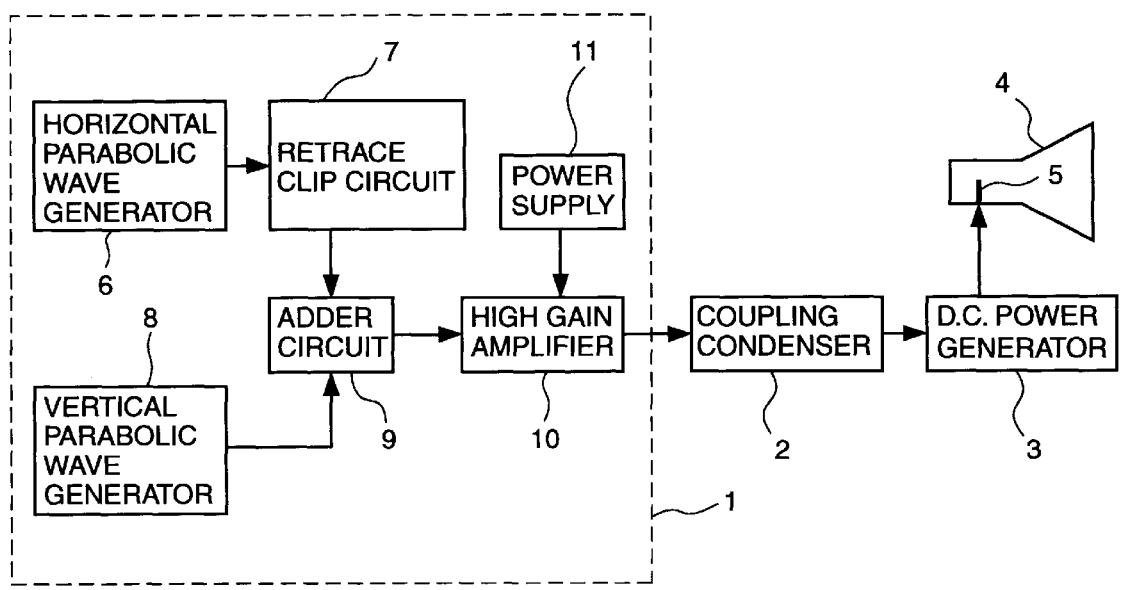
FIG. 1 is a block diagram showing the overall structure of a display using a dynamic focus circuit according to a first embodiment of the present invention.

A first embodiment of the present invention will hereinafter be described with reference to FIG. 1. FIG. 1 is a diagram showing an example in which the present invention is applied to a cathode-ray-tube display.

A dynamic focus circuit 1 comprises a horizontal parabolic wave generator 6, a retrace clip circuit 7, a vertical parabolic wave generator 8, an adder circuit 9, a high gain amplifier 10 and a power supply 11. An output produced from the dynamic focus circuit 1 is supplied from a D.C. power generator 3 to a focus electrode 5 of a cathode-ray tube 4 through a coupling condenser 2, so that a beam of electrons can be most satisfactorily focused on all the positions on the screen of the cathode-ray tube 4.

Figure 2:
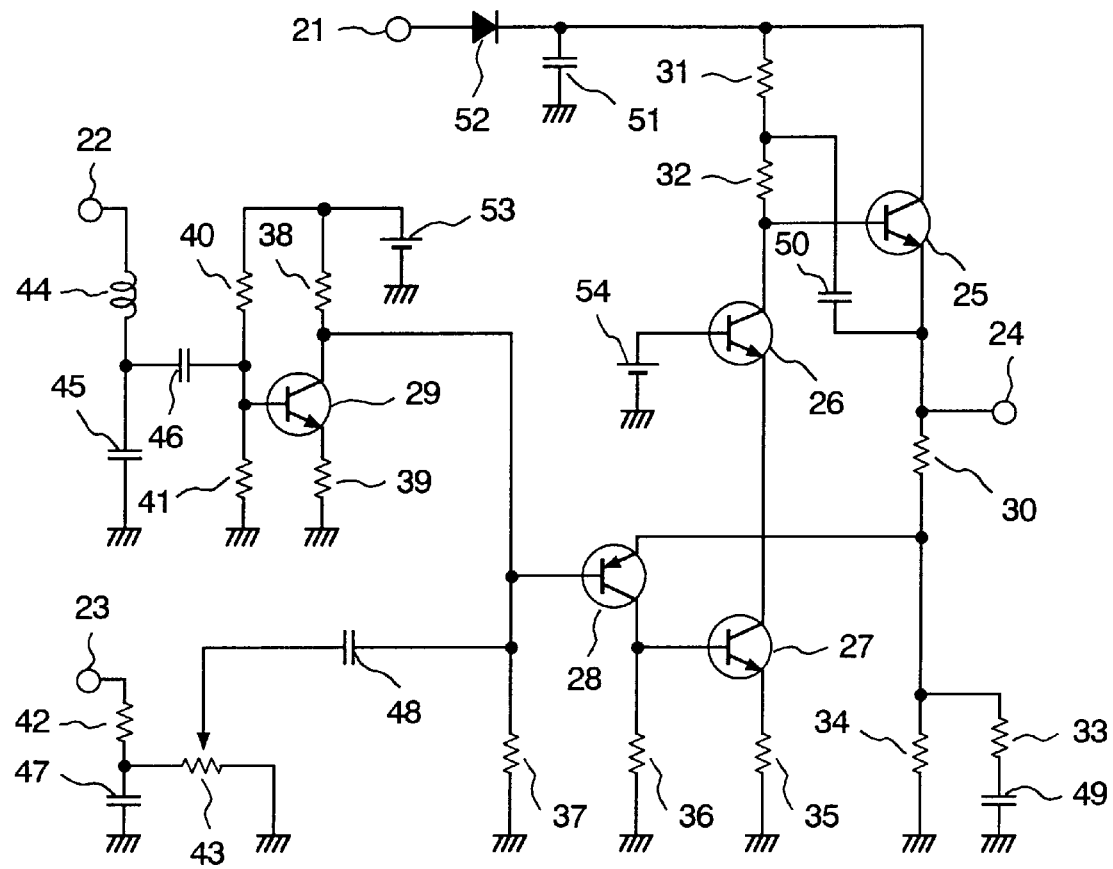
FIG. 2 is a specific circuit diagram illustrating the dynamic focus circuit shown in FIG. 1.
Figure 3A:
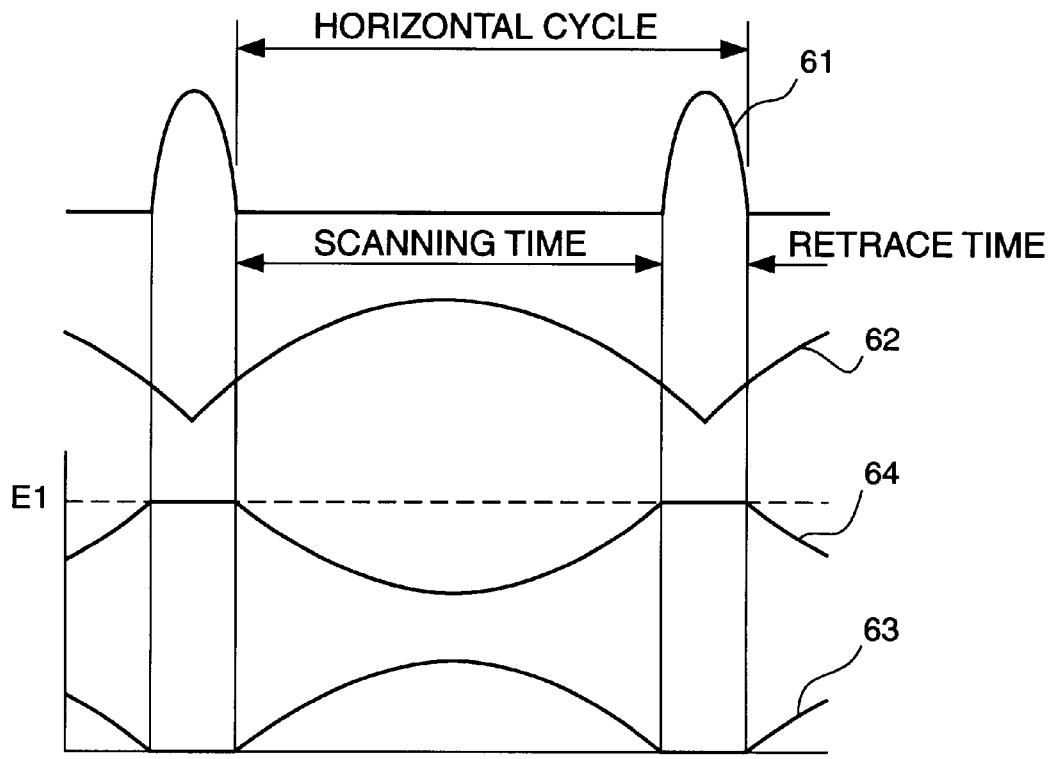
FIG. 3 is a diagram showing waveforms obtained at respective portions, for describing the operation of the dynamic focus circuit shown in FIG. 1.
Figure 3B:
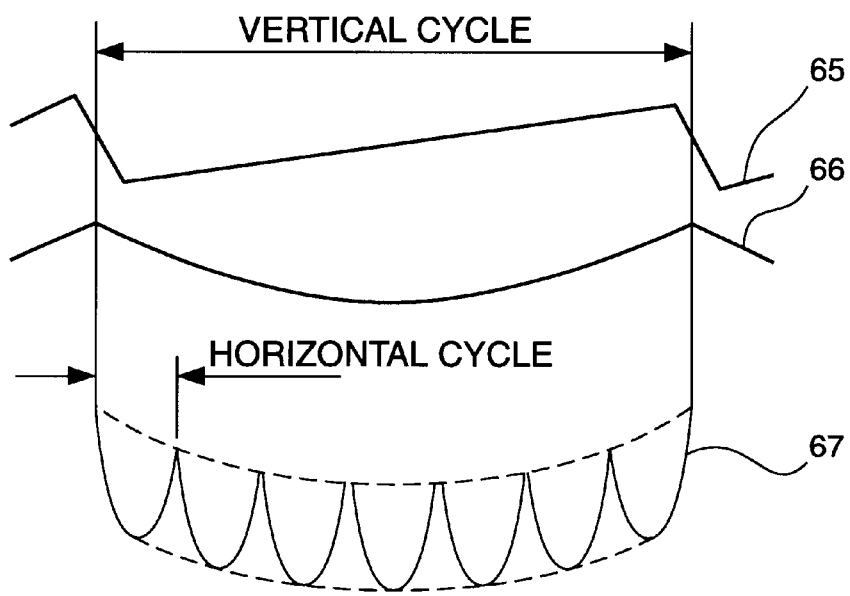

A specific example of a circuit configuration of the dynamic focus circuit 1 is shown in FIG. 2. Operating waveforms at respective portions of the dynamic focus circuit 1 are illustrated in FIG. 3. The present embodiment will be described specifically with reference to FIGS. 2 and 3.

Figure 6A:
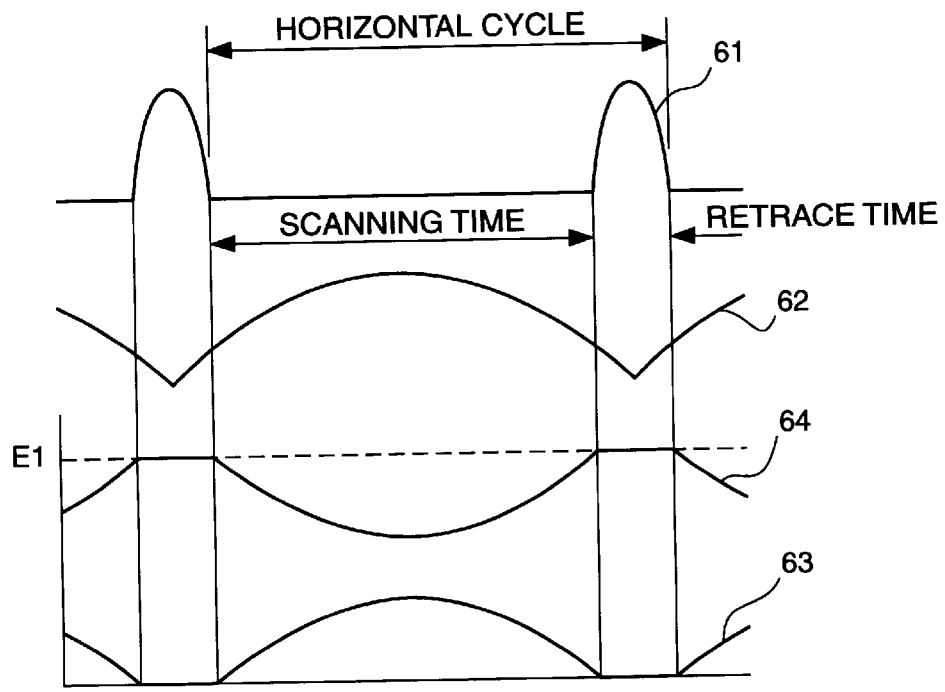
FIG. 6 is a diagram showing waveforms obtained at respective portions, for describing the operation of the dynamic focus circuit shown in FIG. 4.
Figure 6B:
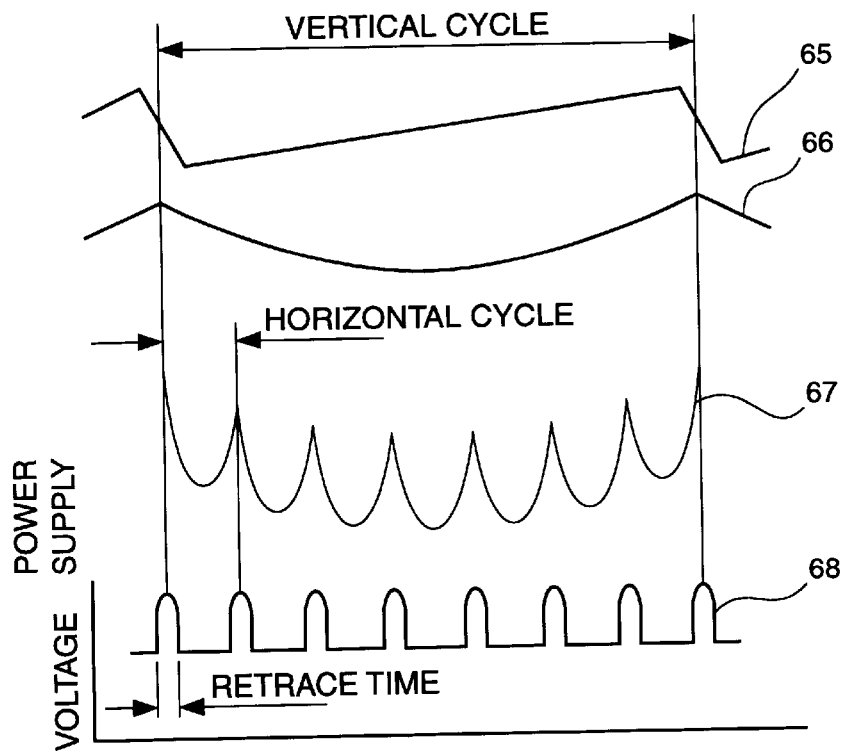

Referring to FIG. 2, the horizontal parabolic wave generator 6 shown in FIG. 6 comprises a coil 44, a capacitor 45, etc. A horizontal pulse waveform 61 shown in FIG. 3 is inputted from an input terminal 22. The horizontal pulse waveform 61 is integrated in two steps by the coil 44 and the capacitor 45 so as to obtain a horizontal parabolic waveform 62.

The retrace clip circuit 7 comprises a power supply 53 (voltage E1), resistors 38 through 41 and a transistor 29. The horizontal parabolic waveform 62 is applied to a base terminal of the transistor 29 through a capacitor 46. A voltage division ratio between the resistors 40 and 41 is set to the most suitable value so that the transistor 29 is cut off during a time corresponding to a retrace time. Thus, a waveform 63 and a clipped horizontal parabolic waveform 64 are respectively obtained from an emitter terminal of the transistor 29 and a collector terminal thereof before the synthesis of the horizontal parabolic waveform 62 and a vertical parabolic waveform to be described later.

On the other hand, the vertical parabolic wave generator 8 is composed of a resistor 42, a capacitor 47, etc. A vertical sawtooth waveform 65 shown in FIG. 3 is inputted from an input terminal 23 and is integrated by the resistor 42 and the capacitor 47 to obtain a vertical parabolic waveform 66. After the amplitude of the vertical parabolic waveform 66 has been adjusted by a variable resistor 43, the so-adjusted vertical parabolic waveform 66 is supplied to the collector terminal of the transistor 29 through a capacitor 48. As a result, the vertical parabolic waveform 66 is combined with the clipped horizontal parabolic waveform 64 to obtain a waveform 67.

The resultant waveform 67 is applied to the high gain amplifier 10 shown in FIG. 1. Each waveform obtained by clipping a retrace time shown in the waveform 67 is amplified by the high gain amplifier 10. However, since the retrace time is suppressed, the gain of the high gain amplifier 10 can be increased (first effect). Incidentally, the high gain amplifier 10 comprises transistors 25 through 28, resistors 30 through 37, capacitors 49 and 50, and a power supply 54 as shown in FIG. 2.

Further, the power supply 11 shown in FIG. 1 is composed of a diode 52 and a capacitor 51. A pulse voltage of about 1000 Vpp produced from a horizontal deflection circuit (not shown) is inputted to a terminal 21 so as to supply a D.C. voltage of about 1000 V.

The operation of the high gain amplifier 10 will next be described. The waveform 67 inputted to a base terminal of the transistor 28 is signal-inverted, followed by supply to a base terminal of the transistor 27. The transistors 26 and 27 constitute a cascode amplifier, which inverts and amplifies the resultant signal so as to appear at a collector terminal of the transistor 26. Thereafter, the inverted and amplified signal is outputted to a terminal 24 through the transistor 25 of an emitter follower. The resistors 33 and 34 are electrically connected to an emitter terminal of the transistor 25 and an emitter terminal of the transistor 28 is electrically connected to a point where a fractional voltage is obtained from between the resistors 33 and 34, whereby a D.C. negative feedback operation is carried out.

Namely, the high gain amplifier 10 is activated in order of raising the potential applied to the emitter of the transistor 25, increasing the current flowing in the collector of the transistor 28, raising the potential applied to the base of the transistor 27, lowering the potential applied to the collector of the transistor 26 and reducing the potential applied to the emitter of the transistor 25. At this time, the values of the resistors 31 and 32 used as load resistors for the transistor 26 can be increased. If the values thereof are respectively set to 5000 kΩ, for example, then the current flowing in the collector of the transistor 26 becomes about 1 mA on the average and hence low power consumption is of 1 W. It is thus possible to greatly reduce power consumption (second effect).

Further, the high gain amplifier 10 can be driven at low impedance by using the transistor 25 of the emitter follower.

The gain of the high gain amplifier 10 is determined by the ratio of the resistor 30 to a series-parallel element (corresponding to an element composed of the resistors 33 and 34 and the capacitor 49). Accordingly, D.C. gain can be determined by the ratio between the resistors 30 and 34, whereas A.C. gain can be determined by the ratio between the resistors 30 and 33. Therefore, the gain of the high gain amplifier 10 can be increased in a high-frequency domain and its satisfactory frequency response can be obtained.

Further, the connection of the capacitor 50 between the emitter terminal of the transistor 25 and a point where a fraction of an applied voltage is obtained between the resistors 31 and 32 provides an improvement in through rate under a large amplitude operation. Namely, in the present embodiment, the resistors 31 and 32, the transistor 25 and the capacitor 50 constitute a so-called boot strap circuit and permits a great improvement in linearity of the signal applied to the terminal 24. As a result, the frequency response can be greatly improved (third effect).

As examples of circuit constants of the high gain amplifier 10, the values of the resistors 31, 32, 30, 34 and 33 are respectively set to 440 kΩ, 220 kΩ, 660 kΩ, 15 kΩ and 4.7 kΩ and the values of the capacitors 49 and 50 are respectively set to 100 μF and 0.47 μF. In doing so, an output voltage amplitude of 900 Vpp can be obtained under a power supply of 1050 V and at the same time a low power consumption of 1.8 W can be achieved.

Figure 4:
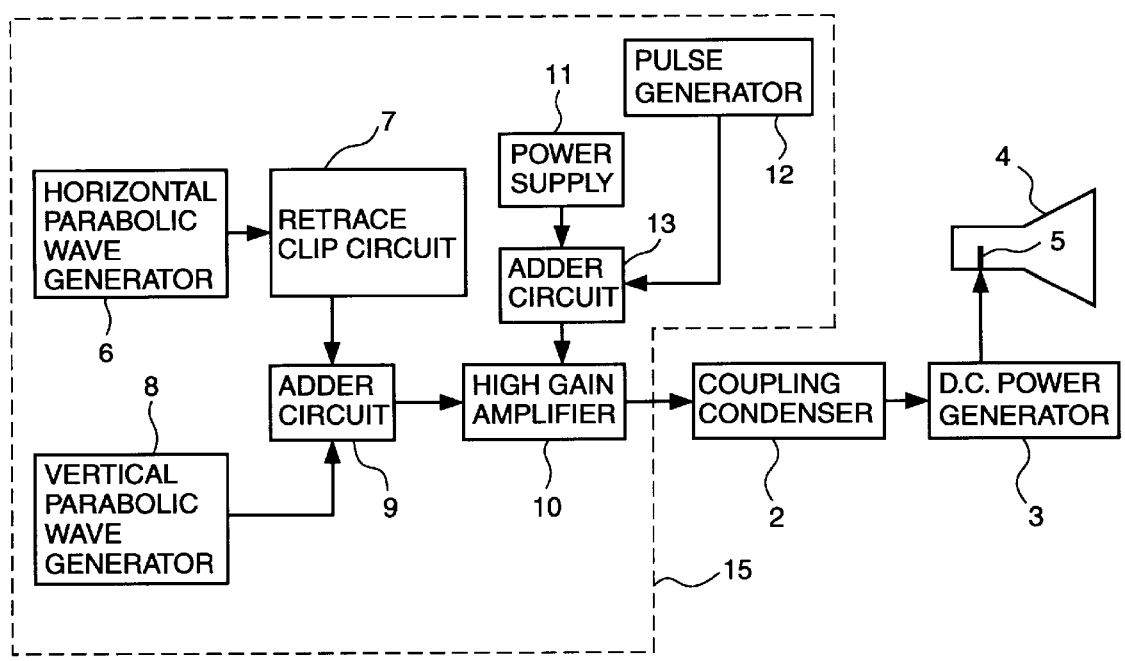
FIG. 4 is a block diagram showing the overall structure of a display using a dynamic focus circuit according to a second embodiment of the present invention.

A second embodiment of the present invention will next be described with reference to FIG. 4. FIG. 4 shows an example in which the present invention is applied to a cathode-ray-tube display.

In FIG. 4, the same elements of structure as those shown in FIG. 1 are identified by the same reference numerals. The present embodiment is different from the embodiment shown in FIG. 1 in that a power supply 11, a retrace pulse generator 12 and an adder circuit 13 are used as a power supply for a high gain amplifier 10.

Figure 5:
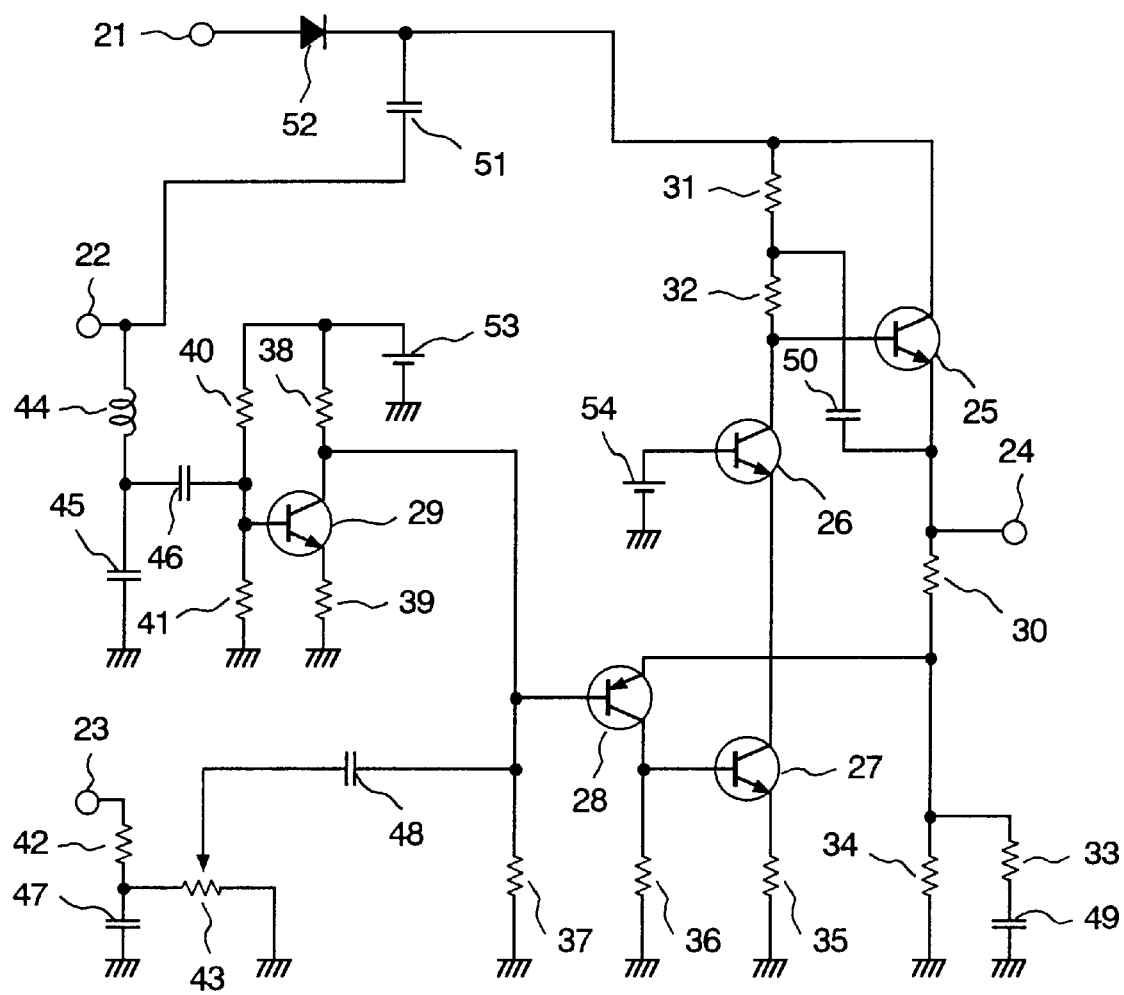
FIG. 5 is a specific circuit diagram illustrating the dynamic focus circuit shown in FIG. 4.

A specific example of a circuit configuration of a dynamic focus circuit 15 is shown in FIG. 5. Operating waveforms at respective portions of the dynamic focus circuit 15 are identical to those illustrated in FIG. 3. The difference between FIG. 5 and FIG. 2 will be specifically described below with reference to FIG. 5.

Referring to FIG. 2, a pulse voltage of about 1000 Vpp, which is inputted from a terminal 21 as the power supply of the high gain amplifier 10, is rectified using a diode 52. Next, the rectified voltage is smoothed by a capacitor 51 to obtain a steady D-C voltage. However, when the gain of the high gain amplifier 10 is further increased, the potential at a point where resistors 31 and 32 are electrically connected to each other, may exceed a source voltage to be supplied due to the operation of the capacitor 50. This time is coincident with a retrace time.

Thus, in the present invention, the adder circuit 13 adds a pulse voltage generated from the retrace pulse generator 12 to a source voltage supplied from the power supply 11 as shown in FIG. 4 to raise the source voltage only during the retrace time. The retrace pulse generator 12 is configured by electrically connecting an input terminal 22 shown in FIG. 5, of a horizontal parabolic wave generator 6 to a ground terminal of the smoothing capacitor 51. A positive pulse corresponding to the retrace time is inputted to the ground terminal of the capacitor 51. As a result, the source voltage can be raised only during the retrace time. The waveform of the source voltage at the time of the above-described connection is designated at numeral 68 shown in FIG. 6. Since such a source voltage waveform makes allowance for the voltage during the retrace time, a dynamic focus voltage large in amplitude can be obtained according to the amplitude of the pulse voltage supplied to the input terminal 22 as compared with the embodiment shown in FIG. 2.

As an example, a dynamic focus voltage of 1000 Vpp can be obtained from an output terminal 24 by supplying 1050 Vpp to the terminal 21 and supplying a pulse voltage of 200 Vpp to the input terminal 22. Power consumption is little increased as compared with the embodiment shown in FIG. 2.

Incidentally, the above embodiment has also described the configurations of the small signal processors, i.e., the horizontal and vertical parabolic wave generators. However, various means are known in addition to these and can be suitably unutilized in combination.

The capacitor 50 is not necessarily required even in the case of either of the above-described embodiments. However, when the output voltage exceeds an output amplitude or voltage of about 600 Vpp, the use of the constants described in the above-described embodiment can provide an extremely great effect to improve the through rate.

According to the present invention, since the dynamic focus voltage can be clipped during the retrace time, the dynamic focus circuit does not need to amplify an unnecessary voltage and is excellent in efficiency. Further, 90% of the source voltage can be obtained as a dynamic focus output voltage. It is also possible to provide less circuit losses and realize extremely low power consumption.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A dynamic focus circuit for producing a dynamic focus voltage for controlling a focused field of a beam of electrons according to the position of deflection of the beam applied onto a display screen of a cathode-ray tube, from a focus electrode of a display using the cathode-ray tube, comprising:

a horizontal cycle signal generator for generating a focus control voltage signal of a horizontal cycle changed into a parabolic shape according to the position of deflection of the electron beam;

a clip circuit for clipping a retrace voltage of the focus control voltage signal produced from said horizontal cycle signal generator;

a vertical cycle signal generator for generating a focus control voltage signal of a vertical cycle changed into a parabolic shape according to the position of deflection of the electron beam;

an adder circuit for adding the focus control voltage signal whose retrace voltage has been clipped by said clip circuit to the focus control voltage signal produced from said vertical cycle signal generator; and an amplifier for amplifying a voltage signal corresponding to the result of addition by said adder circuit and further includes a bootstrap circuit, wherein said boot strap circuit has a cascade amplifier composed of a grounded-base first transistor and a grounded-emitter second transistor and wherein a third transistor of an emitter follower is connected to a collector terminal of said first transistor, a first resistor and a second resistor are series-connected to an emitter terminal of said third transistor so as to provide a fraction of a voltage applied thereacross, an emitter terminal of a fourth transistor is connected to a junction between the first and second resistors, and a collector terminal of said fourth transistor is connected to a base terminal of said second transistor and a base terminal thereof is used as an input terminal.

2. A dynamic focus circuit as claimed in claim 1, wherein said amplifier further has a D.C. feedback circuit for compensating for temperature drifts.

3. A dynamic focus circuit as claimed in claim 1, wherein said amplifier further has a D.C. feedback circuit for compensating for temperature drifts.

4. A dynamic focus circuit for producing a dynamic focus voltage for controlling a focusing field of a beam of electrons according to the position of deflection of the beam applied onto a display screen of a cathode-ray tube, from a focus electrode of a display using the cathode-ray tube, comprising:

a horizontal cycle signal generator for generating a focus control voltage signal of a horizontal cycle changed into a parabolic shape according to the position of deflection of the electron beam;

a vertical cycle signal generator for generating a focus control voltage signal of a vertical cycle changed into a parabolic shape according to the position of deflection of the electron beam;

an adder circuit for adding the focus control voltage signal to the focus control voltage signal generated from said vertical cycle signal generator;

an amplifier for amplifying a voltage signal corresponding to the result of addition by said adder circuit; and a power circuit for supplying a source voltage to said amplifier, said power circuit having means for increasing the supplied voltage according to a retrace time of the focus control voltage signal generated from said horizontal cycle signal generator.

5. A dynamic focus circuit as claimed in claim 4, wherein said amplifier further includes a boot strap circuit.

6. A dynamic focus circuit as claimed in claim 5, wherein said boot strap circuit has a cascode amplifier composed of a grounded-base first transistor and a grounded-emitter second transistor and wherein a third transistor of an emitter follower is connected to a collector terminal of said first transistor, a first resistor and a second resistor are series-connected to an emitter terminal of said third transistor so as to provide a fraction of a voltage applied thereacross, an emitter terminal of a fourth transistor is connected to a junction between the first and second resistors, and a collector terminal of said fourth transistor is connected to a base terminal of said second transistor and a base terminal thereof is used as an input terminal.

7. A display comprising:

a dynamic focus circuit as claimed in any of claims 1–6; and a cathode-ray tube having a focus electrode, said focus electrode thereof being supplied with a voltage signal outputted from said dynamic focus circuit.

* * * * *